Patented Aug. 26, 1924.

1,506,269

UNITED STATES PATENT OFFICE.

FOORD VON BICHOWSKY AND JOHN HARTHAN, OF GLENDALE, CALIFORNIA.

PROCESS FOR THE PRODUCTION OF CYANIDES.

No Drawing.   Application filed February 23, 1921. Serial No. 447,244.

*To all whom it may concern:*

Be it known that we, FOORD VON BICHOWSKY and JOHN HARTHAN, citizens of the United States of America, and residing in the city of Glendale, in the county of Los Angeles and the State of California, have invented certain new and useful Improvements in Processes for the Production of Cyanides, of which the following is a specification.

In the specification of the application for Letters Patent Serial No. 419,458, filed October 25, 1920, now United States Patent No. 1,417,702, May 30, 1912, we have described the production of cyanides by heating titanium cyanonitrid or a titanium nitrid with a carbide of iron and certain defined metallic compounds. We have now further discovered that certain other nitrids; notably those of silicon and aluminium as well as the so-called carbonitrids of these elements or mixture of these substances formed as described in United States Patent #1,415,280, May 9, 1922, covering the method for producing compounds of silicon and nitrogen, may also be used in the production of cyanides and that the reaction may be carried out without the use of free carbon.

In the present invention we prefer to heat the above nitrogen compounds with a suitable alkali metal salt of an organic acid or with a suitable inorganic alkali metal salt or alkali earth metal salt, singly or mixtures, with or without a fluxing agent and an impure iron carbid which latter is formed, as in the already referred to co-pending application, by passing methane over a highly heated iron alloy or over pure iron in the form of filings, or as a reduced iron powder, in the presence of sodium carbonate and a siliceous material. The mass so obtained is most suitable for this new process, as the iron present, with the silicon nitride and other nitrogen compounds, is saturated with dissolved carbon, and iron carbide is therefore present in an impure form.

In general when one uses a potassium or a sodium compound, as above, an alkali metal cyanide is formed, but by using barium hydroxide a mixture of barium cyanide and cyanamide is formed, while the employment of suitable calcium salts gives rise to calcium cyanamide.

The process herein described is particularly valuable since the silicon and aluminium nitrides contain a very large proportion of nitrogen and therefore the amount of cyanide that can be obtained from them is proportionally larger than where titanium nitrid is used. In addition to this the metal combined with the nitrogen can be recovered as an oxide in a pure form or it may be utilized in the form of its sodium or other alkali metal or alkali earth metal compound. In that manner sodium silicate, or water glass, and sodium aluminate may be formed, both of which are used extensively in the arts. The iron present in the reaction is thus freed from carbon and its melting point raised which is of value when reusing said iron in a newly prepared and un-nitrified catalytic mass. In addition to this the product is easier to recover in a pure uncolored condition and the amount of alkali substance required can be reduced to more nearly the theoretical amount. In carrying out this reaction it is best to employ in order to avoid loss of nitrogen, as low a temperature as is consistent with obtaining a homogeneous melt. If a ferrocyanide is desired it is only necessary to treat the above iron containing melt with hot water whereupon the cyanide and the iron react, in the well known manner, to form a ferrocyanide and set free hydrogen.

For the purpose of this invention the nitrids and carbonitrids are equivalents.

The following examples will serve to illustrate further the nature of our invention, which, however, is not confined to these examples, and the method of carrying it into practical effect.

Example 1: Heat together for 15 minutes at 800° C. One part by weight of the finely ground mass containing titanium nitrid and silicon nitrid (obtained by heating titaniferous beach sand, sodium carbonate, iron-nickel filings in the presence of methane and nitrogen for 12 hours at 1300° C. this method being described and claimed in the co-pending application) and 4 parts of a mixture of molecular proportions of sodium and potassium carbonates, while excluding oxidizing gases. The reaction which takes place can be represented by the equation:

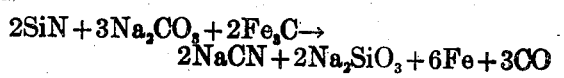

$$2SiN + 3Na_2CO_3 + 2Fe_3C \rightarrow 2NaCN + 2Na_2SiO_3 + 6Fe + 3CO$$

The cyanide contained therein may be recovered in any convenient manner.

Example 2: Melt together for half an hour at about 1300° a mixture of 6 parts of barium hydroxide and 1 part of barium chloride, as a flux, and one part of a mass composed of silicon nitrid carrying with it aluminium nitride as an impurity and iron carbid. Barium cyanide will be formed together with some cyanamide.

We claim:

1. The production of cyanides of the alkali metals which consists in heating a silicon nitride containing mass with iron carbide in the presence of an alkali metal compound and in the absence of free carbon.

2. The production of cyanides of the alkali metals which consists in heating a silicon nitride containing mass with iron carbide in the presence of an alkali metal compound and in the absence of free carbon but in the presence of a flux.

3. The production of sodium cyanide which consists in heating a silicon nitride containing mass with iron carbide in the presence of sodium carbonate and in the absence of free carbon.

4. The process of producing sodium cyanide by heating silicon nitrid, containing titanium nitride, with iron carbide in the presence of sodium carbonate and in the absence of free carbon.

FOORD VON BICHOWSKY.
JOHN HARTHAN.